United States Patent
Ruy Frota de Souza

(10) Patent No.: US 7,367,763 B2
(45) Date of Patent: May 6, 2008

(54) SHRINK FIT TOOL HOLDER WITH GROOVES

(75) Inventor: Filho Ruy Frota de Souza, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 293 days.

(21) Appl. No.: 11/300,915

(22) Filed: Dec. 15, 2005

(65) Prior Publication Data

US 2007/0140803 A1  Jun. 21, 2007

(51) Int. Cl.
*B23B 31/117* (2006.01)

(52) U.S. Cl. ..................................... 409/234; 279/103

(58) Field of Classification Search .............. 408/238, 408/239 R, 239 A; 409/232, 234; 279/9.1, 279/103, 102; B23Q 3/12; B23B 31/117
See application file for complete search history.

(56) References Cited

U.S. PATENT DOCUMENTS

| | | | |
|---|---|---|---|
| 94,250 A | 8/1869 | Smallwood | |
| 2,535,320 A | 12/1950 | Richardson | |
| 3,774,928 A | 11/1973 | Hanak et al. | |
| 3,961,853 A | 6/1976 | Grimpe | |
| 4,035,007 A | 7/1977 | Harrison et al. | |
| 4,314,396 A | 2/1982 | Nunlist et al. | |
| 4,818,161 A | 4/1989 | Cook | |
| 5,127,780 A | 7/1992 | Massa | |
| 5,311,654 A | 5/1994 | Cook | |
| 5,378,091 A * | 1/1995 | Nakamura | 409/132 |
| 5,582,494 A | 12/1996 | Cook | |
| 5,979,912 A | 11/1999 | Cook | |
| 5,992,860 A * | 11/1999 | Marquart | 279/102 |
| 6,035,512 A | 3/2000 | Cook | |
| 6,260,858 B1 | 7/2001 | DeLucia | |
| 6,315,506 B1 | 11/2001 | Mizoguchi | |
| 6,339,868 B1 * | 1/2002 | Nagaya et al. | 29/447 |
| 6,390,482 B1 * | 5/2002 | Hanoch | 279/102 |
| 6,394,466 B1 | 5/2002 | Matsumoto et al. | |
| 6,595,528 B2 * | 7/2003 | Voss | 279/102 |
| 6,861,625 B1 * | 3/2005 | Haimer et al. | 219/607 |
| 6,938,903 B1 | 9/2005 | Haimer | |
| 7,182,558 B2 * | 2/2007 | Haimer | 409/234 |
| 7,217,072 B1 * | 5/2007 | Haimer | 409/234 |
| 2002/0094250 A1 | 7/2002 | Voss | |
| 2004/0052598 A1 | 3/2004 | Haimer | |
| 2007/0059117 A1 | 3/2007 | Haimer et al. | |
| 2007/0246899 A1 | 10/2007 | Haimer | |

FOREIGN PATENT DOCUMENTS

| | | | |
|---|---|---|---|
| DE | 10121743 A1 * | 11/2002 | |
| JP | 11235608 A * | 8/1999 | |
| JP | 2000015505 A * | 1/2000 | |
| JP | 2001105208 A * | 4/2001 | |
| JP | 20011353634 A * | 12/2001 | |
| WO | WO 2005120751 A2 * | 12/2005 | |

* cited by examiner

*Primary Examiner*—Daniel W. Howell
(74) *Attorney, Agent, or Firm*—Larry R. Meenan

(57) ABSTRACT

A shrink fit tool holder includes a shank or body that includes a tool holder portion, a flange member, a tapered outer surface that generally corresponds to a tapered bore of a spindle, and a central bore or aperture for accommodating a cutting tool. The central bore includes a plurality of grooves formed in a predetermined pattern that decrease a surface contact area between the tool holder portion and the cutting tool, thereby reducing an amount of conductive heat transfer between the tool holder portion and the cutting tool. As a result, there is less expansion in the tool shank relative to the tool holder.

6 Claims, 1 Drawing Sheet

SHRINK FIT TOOL HOLDER WITH GROOVES

BACKGROUND OF THE INVENTION

It is known in the art to utilize heat shrink or shrink fit tool assemblies in industrial applications. The prior designs have utilized unitary chucks having an inner diameter slightly smaller than the exterior diameter of the shank of the cutting tool or other work piece. During use the tool chuck is heated, typically by means of induction heating, causing the chuck to expand a sufficient amount to allow the tool shank to be inserted within the chuck. The tool is then allowed to cool during which the thermal contraction of the chuck exerts a uniform pressure on the tool shank, allowing the chuck to shrink down around the tool shank to securely lock or hold the shank in place. It has long been recognized that these types of heat shrink tool assemblies provide an improvement in accuracy and rigidity over standard milling chucks or collet chucks.

In order to remove the tool, the chuck is re-heated to expand the opening. During the heating process the chuck transfers heat to the tool shank itself. The expanding tool shank can create problems with the removal of the tool from the chuck, even resulting in the tool remaining grasped by the chuck and requiring a significant force to remove the tool or a high temperature applied to the tool holder Accordingly, there is a need for a heat shrink tool assembly that allows for the easy and quick removal of the tool from the chuck, especially in tools with small diameters. The thermal expansion is proportional to part dimension and the temperature difference between the tool and the chuck. In small tools, the removal may become an issue as the thermal expansion approaches the manufacturing tolerances.

BRIEF SUMMARY OF THE INVENTION

To solve these and other problems associated with conventional shrink fit or heat shrink tool holders, the inventors of the present invention have developed a shrink fit tool holder comprising a shank including a tool holder portion, and a central bore or aperture for accommodating a cutting tool, the central bore including a plurality of grooves formed in a predetermined pattern, wherein an application of heat to said tool holder will cause said central bore to expand outwardly, and wherein the removal of heat will cause said tool holder to contract inwardly, thereby rigidly maintaining the cutting tool within the tool holder by shrink fit.

In another aspect of the invention, a shrink fit tool holder comprises a body including a tool holder portion, and a central bore or aperture for accommodating a cutting tool, the central bore including a plurality of grooves formed in a predetermined pattern, wherein the plurality of grooves decreases a surface contact area between the tool holder portion and the cutting tool, thereby reducing an amount of conductive heat transfer between the tool holder portion and the cutting tool.

BRIEF DESCRIPTION OF THE DRAWINGS

Further features of the present invention, as well as the advantages derived therefrom, will become clear from the following detailed description made with reference to the drawings in which.

DETAILED DESCRIPTION OF THE INVENTION

Figure 1:
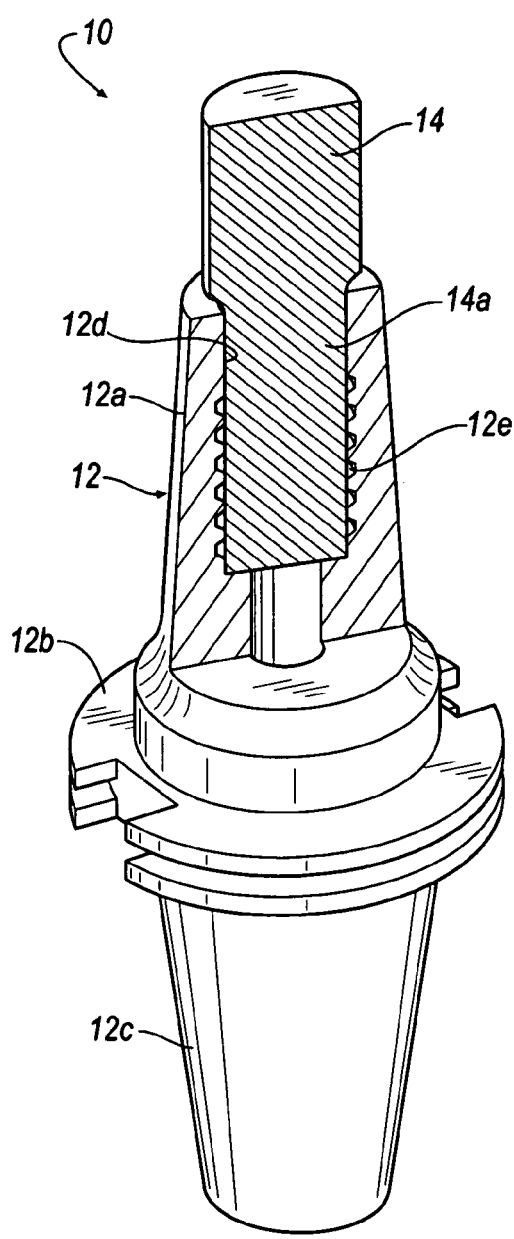
FIG. 1 is a partial cut-away perspective view of a shrink fit tool holder according to an embodiment of the invention.
Figure 2:
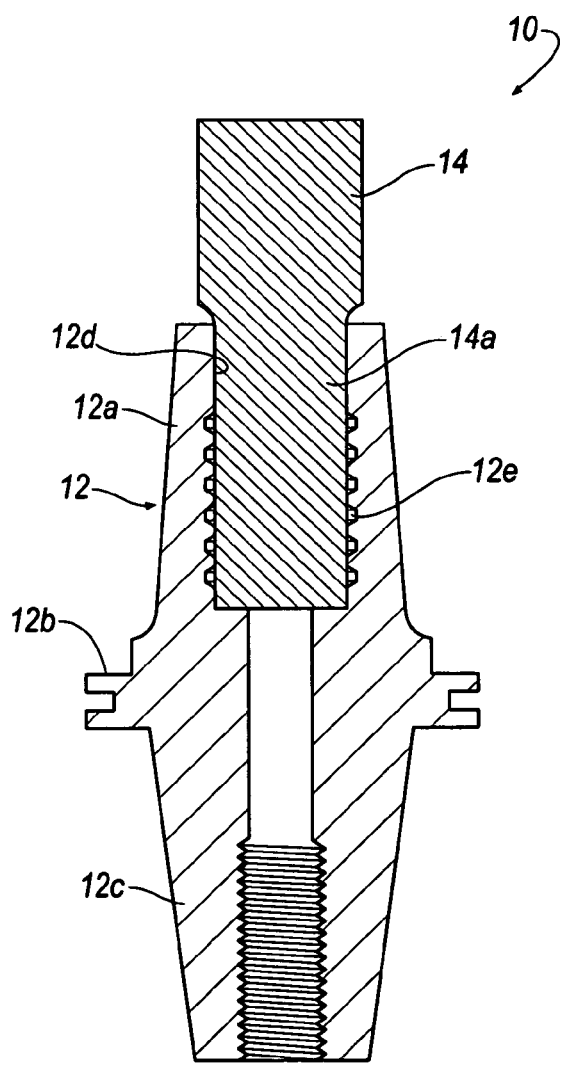
FIG. 2 is a cross-sectional view of the shrink fit tool holder taken along line 2-2 of FIG. 1.

Referring now to FIGS. 1 and 2, there is shown an embodiment of a shrink fit tool holder, shown generally at 10, for detachably retaining a rotary cutting tool 14 according to the invention. In general, the shrink fit tool holder 10 comprises a shank or body 12 that includes a tool holder portion 12a, a flange member 12b, a tapered outer surface 12c that generally corresponds to a tapered bore of a spindle (not shown), and a central bore or aperture 12d for accommodating the cutting tool 14.

The central aperture 12d is formed to be approximately 0.0001-0.0020 inches (0.00254-0.0508 mm) less in diameter than a shank portion 14a of the cutting tool 14. This amount depends on the nominal size and the required torque transmission capacity. In order to insert the cutting tool 14 within the tool holder 10, the tool holder portion 12a of the tool holder 10 is externally heated, for example, to a temperature of approximately 650° F. Due to the thermal expansion characteristics of the tool holder 10, the application of heat to the tool holder 10 causes the tool holder 10, and in particular, the tool holder portion 12a of the body 12 to expand resulting in the central aperture 12d enlarging or increasing in diameter a sufficient distance, typically about 0.0003 to 0.0030 inches (0.00762-0.0762 mm), to allow the tool shank 14a to be inserted within the central aperture 12d. When the tool shank 14a is inserted a sufficient distance within the central aperture 12d, the external application of heat is discontinued and the tool holder 10 is allowed to cool back to ambient temperature, wherein thermal contraction causes the aperture 12d to contract and form a rigid bond between the tool holder 10 and the shank portion 14a of the cutting tool 14. As such, the cutting tool 14 is rigidly maintained within the tool holder 10 in a concentric fashion for high tolerance machining applications. To remove the cutting tool 14, heat is again applied to the tool holder 10 causing the tool holder 10, and in particular, the tool holder portion 12a to expand outwardly. As the tool holder 10 expands, the tool shank 14a can be withdrawn from within the central aperture 12d of the tool body 12.

As discussed above, prior art designs suffer from the transfer of heat from the tool chuck or tool holder to the cutting tool itself. One aspect of the invention is to minimize the transfer of heat from the tool holder to the cutting tool. This aspect is accomplished by forming a predetermined pattern of grooves 12e on the central aperture 12d of the tool body 12, as shown in FIGS. 1 and 2. The predetermined pattern can be any desirable pattern, for example, one or more rings, a spiral pattern, a thread-like pattern, and the like. The distance between the grooves 12e may vary as needed. As the heat is also conducted axially to the rear portion of the tool holder 10, and thus reducing the expansion of the rear portion, more grooves 12e may be necessary in the rear end of the aperture 12d to further minimize the amount of heat to be transferred to the tool 14.

In the illustrated embodiment, the grooves 12e are trapezoidal in cross-sectional shape. Specifically, the top of the groove 12e proximate the central aperture 12d has a larger dimension as compared to the bottom of the groove 12e. However, it will be appreciated that the invention is not limited by the cross-sectional shape of the grooves 12e, and that the invention can be practiced with any desirable shape that will minimize the transfer of heat from the tool holder 10 to the cutting tool 14, for example, any polygonal shape, such as rectangular, triangular, and the like, and/or any circular shape. The grooves 12e should be shallow in order to minimize the elastic deformation of the wall of the aperture 12d when collapsing over the tool 14 when the heat is discontinued.

The amount of heat that is conducted from the tool body 12 to the cutting tool 14 is proportional to the contact surface area therebetween. By decreasing the contact surface area by the inclusion of the grooves 12e on the central aperture or bore 12d of the tool body 12, the temperature needed to remove the cutting tool 14 from the tool holder 10 is reduced, thereby allowing for the easier removal of the tool 14 from the tool holder 10. In addition, a lower temperature is needed to cause the necessary expansion of the tool holder 10 to insert the tool shank 14a into the central bore 12d. It has been discovered that the decrease in the surface area between the central bore 12d and the tool shank 14a does not substantially decrease the grip strength, as it would if the grip length would be reduced.

It has been found through FEA (Finite Element Analysis) that the inclusion of the grooves 12e on a tool holder 10 made of commercial steel with a central bore of about 0.5 inch and a tool 14 made of a commercial High Speed Steel will reduce the temperature of the tool shank 14a from approximately 510° F. to approximately 460° F. when the external temperature of the tool holder 10 reaches about 750° F. In the FEA, an incremental temperature was applied to the tool holder 10 at a rate of about 200° F./second. For a given radial interference of about 0.0008 inches (0.02032 mm), a temperature difference of about 290° F. between the external surface of the tool holder 10 and the tool 14 is required in order to withdraw the tool 14 from the tool holder 10.

As the FEA demonstrates, the inclusion of grooves 12e on the tool holder 10 produces the expected results of reducing the temperature of the tool shank 14a from approximately 510° F. to approximately 460° F. when the external temperature of the tool holder 10 reaches about 750° F. In this simulation, a tool holder without grooves 12e would require an external temperature of about 1290° F. (which would be excessively high) to allow the required temperature difference of about 290° F. in order to withdraw the tool 14 from the tool holder 10.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A shrink fit tool holder, comprising:
    a shank including a tool holder portion, and a central bore for accommodating a cutting tool, the central bore including a plurality of grooves formed in a predetermined pattern,
    wherein an application of heat to said tool holder will cause said central bore to expand outwardly, and wherein the removal of heat will cause said central bore to contract inwardly to rigidly maintain the cutting tool within the tool holder by shrink fit,
    wherein the plurality of grooves are trapezoidal in cross-sectional shape, and
    wherein the plurality of grooves reduces a temperature difference between the tool holder portion and the cutting tool.

2. The shrink fit tool holder of claim 1, wherein the predetermined pattern comprises a spiral pattern.

3. The shrink fit tool holder of claim 1, wherein the shank further comprises a flange member, and a tapered outer surface that generally corresponds to a tapered bore of a spindle.

4. A shrink fit tool holder, comprising:
    a body including a tool holder portion, and a central bore or aperture for accommodating a cutting tool, the central bore including a plurality of grooves formed in a predetermined pattern,
    wherein the plurality of grooves are trapezoidal in cross-sectional shape, and
    wherein the plurality of grooves decreases a surface contact area between the tool holder portion and the cutting tool, thereby reducing an amount of conductive heat transfer between the tool holder portion and the cutting tool.

5. The shrink fit tool holder of claim 4, wherein the predetermined pattern comprises a spiral pattern.

6. The shrink fit tool holder of claim 4, wherein the body further comprises a flange member, and a tapered outer surface that generally corresponds to a tapered bore of a spindle.

* * * * *